United States Patent
Huang et al.

(10) Patent No.: US 12,241,165 B2
(45) Date of Patent: Mar. 4, 2025

(54) THREE-PHASE SYSTEM VANADIUM TRIOXIDE/VANADIUM NITRIDE/MOLYBDENUM CARBIDE NANOELECTRODE MATERIAL, AND PREPARATION METHOD AND APPLICATION THEREOF

(71) Applicant: SHAANXI UNIVERSITY OF SCIENCE & TECHNOLOGY, Shaanxi (CN)

(72) Inventors: Jianfeng Huang, Xi' an (CN); Shuainan Li, Xi' an (CN); Liangliang Feng, Xi' an (CN); Liyun Cao, Xi' an (CN); Yongqiang Feng, Xi' an (CN); Danyang He, Xi' an (CN); Li Feng, Xi' an (CN); Xiao Zhang, Xi' an (CN)

(73) Assignee: SHAANXI UNIVERSITY OF SCIENCE & TECHNOLOGY, Shaanxi (CN)

( * ) Notice: Subject to any disclaimer, the term of this patent is extended or adjusted under 35 U.S.C. 154(b) by 644 days.

(21) Appl. No.: 17/643,568

(22) Filed: Dec. 9, 2021

(65) Prior Publication Data
US 2022/0186388 A1  Jun. 16, 2022

(30) Foreign Application Priority Data
Dec. 15, 2020 (CN) .......................... 202011484040.X (51) Int. Cl.
*C25B 11/037* (2021.01)
*C01B 21/06* (2006.01)
(Continued)

(52) U.S. Cl.
CPC ........ *C25B 11/037* (2021.01); *C01B 21/0637* (2013.01); *C01B 32/949* (2017.08);
(Continued)

(58) Field of Classification Search
CPC ......... C25B 11/037; C25B 1/04; C25B 11/04; C25B 11/052; C25B 11/091;
(Continued)

(56) References Cited

PUBLICATIONS

Soumen Duttaa, Arindam Indra, Yi Feng, HyukSu Han, Taeseup Song, Promoting electrocatalytic overall water splitting with nanohybrid of transition metal nitride-oxynitride, Sep. 22, 2018, Applied Catalysis B: Environmental, 241, 521-527 (Year: 2018).*

* cited by examiner

*Primary Examiner* — Anthony J Zimmer
*Assistant Examiner* — Joshua Maxwell Speer
(74) *Attorney, Agent, or Firm* — Alleman Hall & Tuttle LLP (57) ABSTRACT

Provided is a three-phase system $V_2O_3$/VN/$Mo_2C$ nanoelectrode material, and a preparation method and application thereof. The nanoelectrode material comprises $V_2O_3$ particles, VN particles, and $Mo_2C$ particles. The $V_2O_3$ particles, VN particles, and $Mo_2C$ particles are interlaced in lattice stripes and are uniformly distributed. The mass ratio of the $V_2O_3$, VN and $Mo_2C$ is (1 to 4):(10 to 40):(4 to 16). The above-mentioned three kinds of nanoparticles are intertwined to form more incoherent interface area. The increase in the area of the incoherent interface area will cause more defects, so that more active sites are provided, and the hydrogen production performance is improved.

9 Claims, 5 Drawing Sheets

(51) Int. Cl.
  *C01B 32/949* (2017.01)
  *C01G 31/02* (2006.01)
  *C25B 1/04* (2021.01)
  *C25B 11/04* (2021.01)
(52) U.S. Cl.
  CPC ............... *C01G 31/02* (2013.01); *C25B 1/04* (2013.01); *C25B 11/04* (2013.01); *C01P 2004/64* (2013.01); *C01P 2006/40* (2013.01)
(58) Field of Classification Search
  CPC ... C01B 21/0637; C01B 32/949; C01G 31/02; C01P 2004/64; C01P 2006/40; C01P 2002/72; C01P 2004/03; C01P 2004/04; B82Y 40/00
  See application file for complete search history.

THREE-PHASE SYSTEM VANADIUM TRIOXIDE/VANADIUM NITRIDE/MOLYBDENUM CARBIDE NANOELECTRODE MATERIAL, AND PREPARATION METHOD AND APPLICATION THEREOF

TECHNICAL FIELD

The present disclosure belongs to the technical field of electrocatalyst synthesis and application, and specifically relates to a three-phase system $V_2O_3/VN/Mo_2C$ nanoelectrode material and a preparation method and application thereof.

BACKGROUND

Hydrogen production by electrolysis of water is considered to replace traditional fossil fuels and be clean energy with little pollution to the environment. A platinum-based catalytic material has excellent hydrogen evolution reaction (HER) performance, but is expensive, and the amount of platinum element on the earth is rare. Based on this, the most urgent task in the field of electrocatalytic hydrogen production is to search for non-noble metal electrocatalysts which are low in cost, good in stability, excellent in performance, and sustainable.

Su et al. designed a method for preparing $V_2O_3$ nanopowders by thermal decomposition of oxalate to obtain a $V_2O_3$ phase with high purity and good dispersibility ([Pinna N, Antonietti M, Niederberger M. A novel nonaqueous solution to $V_2O_3$ and $Nb_2O_5$ nanocrystals [J]. Colloids & Surfaces A Physicochemical & Engineering Aspects, 2004, 250: 211-213.]). Among transition metal nitrides, VN has excellent electrical conductivity, low density, and good electronic conductivity, but its synthesis temperature is high, and it easily agglomerates and even causes partial structural collapse, which is unfavorable for the exposure of active sites of the material, resulting in poor catalytic activity of the material ([Wang Y, Wang L, Tong M, et al. Co—VN encapsulated in bamboo-like N-bonded carbon nanotubes for ultrahigh-stability of oxygen reduction reaction [J]. Nanoscale, 2018, 10: 4311-4319.]). $Mo_2C$ in the transition metal carbide has a Pt-like d-electronic structure and has excellent hydrogen adsorption performance, but the poor conductivity limits its catalytic activity.

SUMMARY

The present disclosure aims to provide a three-phase system $V_2O_3/VN/Mo_2C$ nanoelectrode material, and a preparation method and application thereof. The three-phase system $V_2O_3/VN/Mo_2C$ nano-electrode material has satisfactory catalytic performance, can be widely applied to hydrogen production by electrolyzing water in industry, and is economical, practical, efficient, and convenient.

In a first aspect, the present disclosure provides a three-phase system $V_2O_3/VN/Mo_2C$ nanoelectrode material. The nanoelectrode material comprises $V_2O_3$ particles, VN particles, and $Mo_2C$ particles. The $V_2O_3$ particles, VN particles, and $Mo_2C$ particles are interlaced in lattice stripes and are uniformly distributed. The above-mentioned three kinds of nanoparticles are intertwined to form more incoherent interface area ("incoherent interface" refers to the area formed by the interweaving of crystalline phases of different phases). The increase of the area of the incoherent interface area will cause more defects, so that more active sites are provided, and the hydrogen production performance is improved.

A mass ratio of the $V_2O_3$, VN and $Mo_2C$ is (1 to 4):(10 to 40):(4 to 16). VN is low in cost, rich in content, and good in electrical conductivity. $Mo_2C$ has satisfactory $H^+$ binding energy. V—O is an active ingredient for promoting hydrogen production. In the three-phase system $V_2O_3/VN/Mo_2C$ nanoelectrode material, VN is modified by $V_2O_3$ and $Mo_2C$, so that the synergistic catalytic effect is enhanced, and the electrochemical stability of the material is greatly improved.

Preferably, particle diameters of the $V_2O_3$ particles, VN particles, and $Mo_2C$ particles are respectively 10 to 50 nm, 10 to 100 nm, and 5 to 100 nm.

Preferably, the nanoelectrode material has a heterojunction structure. The lattice fringes of the three phases are intertwined with each other, and the three-phase heterojunction structure is obvious.

The three-phase system $V_2O_3/VN/Mo_2C$ nano-electrode material of the present disclosure can reveal more catalytic active sites and effectively solve the problems of its weak electrical conductivity and the like by designing special nanostructures. Among them, VN has good electrical conductivity, and a small Tafel slope is beneficial to the desorption of $H_2$. V—O is used as an effective hydrogen evolution reaction (HER) active ingredient to promote the hydrogen production rate. $Mo_2C$ has good hydrogen binding energy, and is beneficial to the adsorption of $H^+$. The three form a composite phase, so that the kinetics of $H^+$ adsorption and $H_2$ desorption can be balanced, and the catalytic activity is improved.

In a second aspect, the present disclosure further provides a preparation method of the three-phase system $V_2O_3/VN/Mo_2C$ nanoelectrode material described in any one of the above aspects. The preparation method comprises the following steps: weighing and mixing the raw materials including carbon-nitrogen homologous compounds, a vanadium source, and a molybdenum source, and then maintaining heat at 600 to 800° C. for 120 to 180 minutes under the protection of inert gas to obtain the three-phase system $V_2O_3/VN/Mo_2C$ nanoelectrode material.

Preferably, the carbon-nitrogen homologous compound is pyrolyzed during the maintaining of heat to generate reducing gas and the components of the $V_2O_3/VN/Mo_2C$ nano electrode material are uniformly dispersed.

Preferably, the mass ratio of the carbon-nitrogen homologous compound, the vanadium source, and the molybdenum source is (30 to 40):(3 to 5):(1 to 3).

Preferably, the carbon-nitrogen homologous compound is at least one of urea, dicyandiamide, and melamine. The carbon-nitrogen homologous compound is more preferably urea.

Preferably, the molybdenum source comprises sodium molybdate dihydrate and/or ammonium molybdate tetrahydrate. The molybdenum source is more preferably sodium molybdate dihydrate. If used herein, the phrase "and/or" means any or all of multiple stated possibilities.

Preferably, the vanadium source comprises at least one of vanadium acetylacetonate, ammonium metavanadate, and sodium metavanadate. The vanadium source is more preferably vanadium acetylacetonate.

In a third aspect, the present disclosure also provides an application of the three-phase system $V_2O_3/VN/Mo_2C$ nanoelectrode material described in any one of the above aspects in hydrogen production by water electrolysis.

The present disclosure has the following beneficial effects:

1. The $V_2O_3/VN/Mo_2C$ nanomaterial of the present disclosure has the advantages of uniform chemical composition, high purity and high crystallinity, and the three phases are intertwined to promote the catalytic effect.

2. The $V_2O_3/VN/Mo_2C$ electrode material of the present disclosure contains two types of conductive phases of $V_2O_3$ and VN at the same time, so that the electron conduction paths are increased, and the polarization of electron conduction is reduced.

3. The $V_2O_3/VN/Mo_2C$ electrode material of the present disclosure has good conductivity and low overpotential, and has great advantages in the aspect of hydrogen production by water electrolysis.

DETAILED DESCRIPTION

The present disclosure will be further described below through the following embodiments. It should be understood that the following embodiments are only used to illustrate the present disclosure, not to limit the present disclosure. Unless otherwise specified, each percentage refers to a mass percentage.

A preparation method of the three-phase system $V_2O_3/VN/Mo_2C$ nanopowder of the present disclosure is exemplarily illustrated below.

A carbon-nitrogen homologous compound, a vanadium source, and a molybdenum source are weighed according to a certain mass ratio. The mass ratio of the carbon-nitrogen homologous compound, the vanadium source, and the molybdenum source can be (30 to 40):(3 to 5):(1 to 3). When the mass ratio of the carbon-nitrogen homologous compound, the vanadium source, and the molybdenum source is out of the above-mentioned range, such as 42:5:3, the nanoparticles agglomerate seriously and the hetero-phase $V_2C$ is introduced.

In the preparation method of the present disclosure, elements of carbon and nitrogen are introduced by using a carbon-nitrogen homologous compound. The carbon-nitrogen homologous compound is pyrolyzed to produce a reducing gas (such as ammonia gas) in the subsequent reaction process, so that the reducing gas not only plays the role of a reducing agent to reduce $V^{5+}$ in the vanadium source into $V^{3+}$ to generate $V_2O_3$ and VN, but also can realize the uniform dispersion of $V_2O_3$ particles, VN particles, and $Mo_2C$ particles in a composite structure, and no additional reducing agent or dispersing agent is needed. In addition, the carbon-nitrogen homologous compound is adopted, the types of the compounds participating in the reaction are reduced, and aggregation, impurity introduction and heterogeneous accumulation during the high-temperature carbonization process are avoided as much as possible. Also, carbon-nitrogen homologous compound is low in price, suitable for industrial production, and safe in reaction.

Preferably, the mass percentage of nitrogen in the carbon-nitrogen homologous compound is more than 30%. During the experimental process, it was unexpectedly discovered that the yield of the generated product is high and the catalytic performance is excellent when the mass percentage of a nitrogen element in the homologue of a carbon source and a nitrogen source is higher. In some embodiments, the carbon-nitrogen homologous compound has a nitrogen content of 40 to 70% by mass. In a specific embodiment, the carbon and nitrogen homologous compounds include, but are not limited to, one or more of dicyandiamide, melamine, and urea.

The weighed carbon-nitrogen homologous compound, the vanadium source, and the molybdenum source are mixed to obtain a mixture, preferably by dry mixing. For example, the mixing can be carried out by means of stirring, ball milling, or the like. The mixing time is not limited, so that all the raw materials are mixed uniformly. The target product $V_2O_3/VN/Mo_2C$ nanopowder is prepared from the mixture in a solid-phase synthesis manner. The solid phase synthesis is carried out under an inert protective atmosphere. The inert protective atmosphere can be argon. Preferably, the flow rate of the inert protective atmosphere is 20 to 100 SCCM, more preferably 20 to 50 SCCM.

In the solid-phase synthesis process, the solid-phase synthesis temperature can be 600 to 800° C., and the solid-phase synthesis time can be 120 to 180 minutes.

In some embodiments, the carbon-nitrogen homologous compound, the vanadium source, and the molybdenum source are mixed and ground for 15 to 25 minutes, placed in a porcelain boat, and placed in a tube furnace, and two furnace plugs are placed at each end of the tube. After the device is connected, the airtightness is firstly checked, and then air is extracted and supplied 3 to 6 times, air in the pipe is exhausted, and air is not extracted after the last air supply. Argon is introduced at a flow rate of 20 to 50 SCCM, heated to 600 to 800° C. at a heating rate of 5 to 10° C./min, and then kept at 600 to 800° C. for 120 to 180 minutes. At higher argon flow rates, the yield will decrease somewhat, with a significant decrease in yield above 50 SCCM. After the mixture is cooled to room temperature, the obtained sample is ground in a mortar for 20 to 30 minutes to obtain $V_2O_3/VN/Mo_2C$ nanopowder.

The synthesis temperature of $Mo_2C$ is slightly higher than that of $V_2O_3$ and VN. In the above preparation process, $V_2O_3$ and VN are gradually formed along with the formation of $Mo_2C$, the three phases of the final product are intertwined, so that the synergistic reaction is promoted. V—O is an effective hydrogen evolution reaction (HER) active ingredient, and the presence of vanadium oxide enhances the stability of the electrocatalyst under potentiostatic polarization (time-current curve), working stably for more than 200 hours.

In the above-mentioned raw material system, the vanadium element may exist in the form of vanadium nitride, vanadium oxide, and vanadium carbide. Through the experiments, under the condition that the amount of vanadium source and calcination temperature are not changed, when the dosage of carbon-nitrogen homologous compound is lower than the ratio of the technical solution (the mass ratio of carbon-nitrogen homologous compound, vanadium source, and molybdenum source is (30 to 40):(3 to 5):(1 to 3)), vanadium mainly exists as vanadium oxide. This is because, when the amount of the carbon-nitrogen homologous compound is small, the amount of the reducing gas generated during pyrolysis is small, and vanadium oxide is reduced preferentially. When the amount of carbon-nitrogen homologous compound is the ratio of the technical solution (the mass ratio of carbon-nitrogen homologous compound, vanadium source, and molybdenum source is (30 to 40):(3 to 5):(1 to 3)), vanadium oxide and vanadium nitride tend to be simultaneously produced. When the amount of carbon and nitrogen homologous compounds is higher than the ratio of the technical solution, vanadium carbide is mainly produced (referring to Comparative Example 1).

The preparation method disclosed by the present disclosure does not need large-scale equipment and harsh reaction conditions, is inexpensive and easily available in raw material, low in cost, high in yield, free of post-treatment, environment-friendly, high in safety, and suitable for industrial production. In some embodiments, the overpotentials of the three-phase system $V_2O_3$/VN/$Mo_2C$ nanopowder prepared by the present disclosure in alkalinity, acidity, and neutrality are 124 mV, 180 mV, and 320 mV respectively at the current density of 10 mA/cm$^2$.

An electrocatalytic hydrogen evolution test is carried out by a CHI660E B17060 electrochemical workstation (Shanghai Chenhua Instrument Co., Ltd.), and a typical three-electrode system test system, wherein the used reference electrode is a Saturated Calomel Electrode (SCE), and the counter electrode is a graphite carbon rod, working electrode is a glassy carbon electrode. The preparation method of the working electrode comprises the following steps: (i) 10 mg sample of the powder was added to a solution of isopropanol (200 μL) to form a uniform mixed solution; (ii) dripping 2 μL of the mixed solution onto the glassy carbon electrode, wherein the loading capacity is about 1.4 mg cm$^{-2}$; and (iii) after the catalyst was air-dried naturally, 2 μl of 1% Nafion was dropped on the surface of the catalyst to prevent the catalyst from falling off during the test. The inventors performed electrochemical tests on the prepared samples under the conditions of acid (0.5 M $H_2SO_4$), alkaline (1 M KOH), and neutral (1 M PBS): (a) when a linear sweep voltammetry curve (LSV) test is carried out, the sweep rate is set to be 3 mV s$^{-1}$, and (b) the current curve (I-t) is plotted over time, at a constant voltage.

Hereinafter, the present disclosure will be further described with the following examples. It should be understood that the following examples are used to explain this disclosure and do not mean to limit the scope of this disclosure. Any non-essential improvements and modifications made by a person skilled in the art based on this disclosure all fall into the protection scope of this disclosure. The specific process parameters below are only exemplary, and a person skilled in the art can choose proper values within an appropriate range according to the description, and are not restricted to the specific values shown below.

EXAMPLE 1

(1) Urea ($CH_4N_2O$), vanadium acetylacetonate ($C_{15}H_{21}O_6V$), and sodium molybdate dihydrate ($Na_2MoO_4 \cdot 2H_2O$) were weighed according to the mass ratio of 30:3:1;

(2) The above raw materials were mixed, ground for 15 minutes, and put in a porcelain boat, the porcelain boat was placed in a tube furnace, and two furnace plugs were placed at two ends of the tube, respectively;

(3) After connecting the device, checking the air tightness, and then carrying out air extraction and air supplementation 3 times, air in the tube was exhausted, no air was extracted after the last air supplementation. Argon gas was introduced at a flow rate of 20 SCCM, heated to 600° C. at a heating rate of 5° C./min, and continuously heated at 600° C. for 120 minutes;

(4) After cooling to room temperature, the obtained sample was ground in a mortar for 15 minutes to obtain $V_2O_3$/VN/$Mo_2C$ nano powder.

Figure 1:
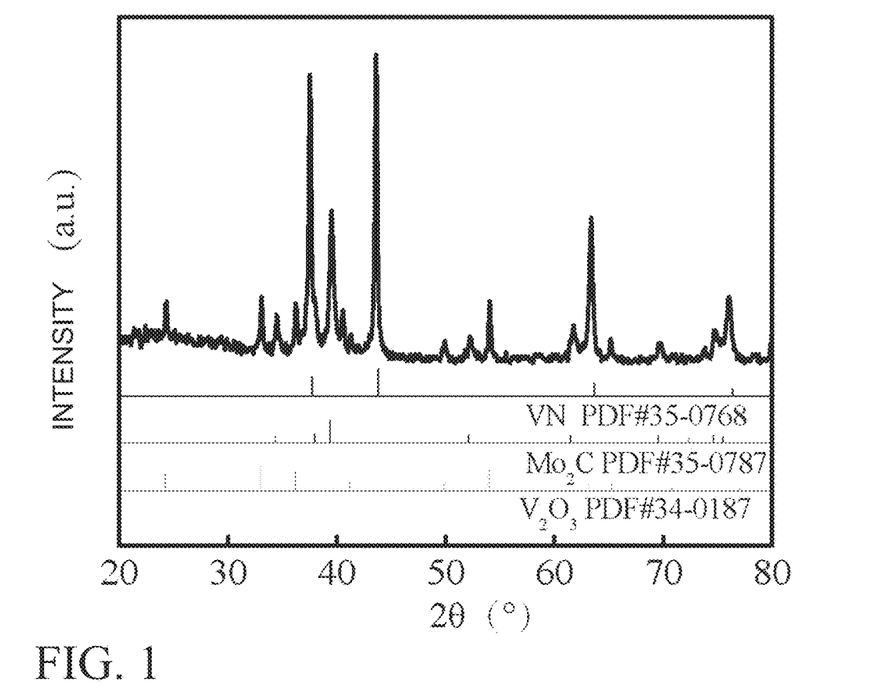
FIG. 1 shows an X-ray diffraction (XRD) pattern of the $V_2O_3/VN/Mo_2C$ nanoelectrode material prepared in Example 1.

FIG. 1 shows the X-ray diffraction (XRD) pattern of the $V_2O_3$/VN/$Mo_2C$ nanoelectrode material prepared in Example 1. It can be seen that the diffraction peaks of $V_2O_3$, VN and $Mo_2C$ are well matched with a standard card, and have high strength, indicating that the prepared $V_2O_3$/VN/$Mo_2C$ has good crystallinity.

EXAMPLE 2

(1) Urea ($CH_4N_2O$), vanadium acetylacetonate ($C_{15}H_{21}O_6V$), and sodium molybdate dihydrate ($Na_2MoO_4 \cdot 2H_2O$) were weighed according to the mass ratio of 35:4:2;

(2) The above raw materials were mixed, ground for 20 minutes, put in a porcelain boat, the porcelain boat was placed in a tube furnace, and two furnace plugs were placed at two ends of the tube, respectively;

(3) After connecting the device, checking the air tightness, and then carrying out air extraction and air supplementation 4 times, air in the tube was exhausted, no air was extracted after the last air supplementation. Argon gas was introduced at a flow rate of 30 SCCM, heated to 700° C. at a heating rate of 10° C./min, and continuously heated at 700° C. for 180 minutes;

(4) After cooling to room temperature, the obtained sample was ground in a mortar for 20 minutes to obtain $V_2O_3$/VN/$Mo_2C$ nano powder.

EXAMPLE 3

(1) Urea ($CH_4N_2O$), vanadium acetylacetonate ($C_{15}H_{21}O_6V$), and sodium molybdate dihydrate ($Na_2MoO_4 \cdot 2H_2O$) were weighed according to the mass ratio of 40:5:3;

(2) The above raw materials were mixed, ground for 25 minutes, put in a porcelain boat, the porcelain boat was placed in a tube furnace, and two furnace plugs were placed at two ends of the tube, respectively;

(3) After connecting the device, checking the air tightness, and then carrying out air extraction and air supplementation 5 times, air in the tube was exhausted, no air was extracted after the last air supplementation. Argon gas was introduced at a flow rate of 40 SCCM, heated to 800° C. at a heating rate of 5° C./min, and continuously heated at 800° C. for 120 minutes;

(4) After cooling to room temperature, the obtained sample was ground in a mortar for 25 minutes to obtain $V_2O_3$/VN/$Mo_2C$ nano powder.

Figure 2:
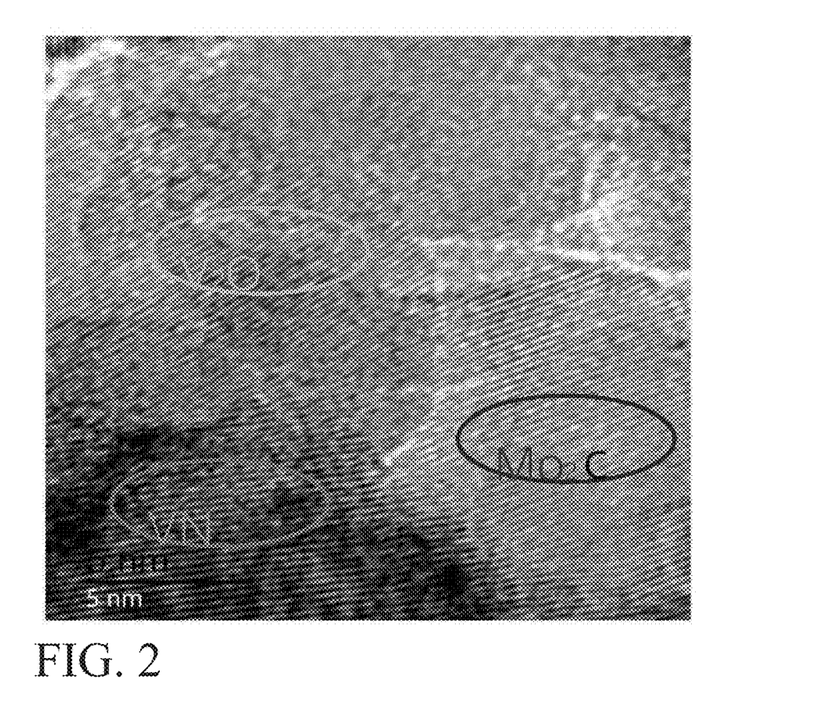
FIG. 2 shows a transmission electron microscopy (TEM) image of the $V_2O_3/VN/Mo_2C$ nanoelectrode material prepared in Example 3.

FIG. 2 shows a transmission electron microscopy (TEM) image of the $V_2O_3$/VN/$Mo_2C$ nanoelectrode material prepared in Example 3. It can be seen that the particle size of $V_2O_3$, VN and $Mo_2C$ is small, and the lattice fringes are obvious and interlaced, which promotes the synergistic catalytic effect between them.

EXAMPLE 4

(1) Urea ($CH_4N_2O$), vanadium acetylacetonate ($C_{15}H_{21}O_6V$), and sodium molybdate dihydrate ($Na_2MoO_4.2H_2O$) were weighed according to the mass ratio of 38:4:2;

(2) The above raw materials were mixed, ground for 20 minutes, put in a porcelain boat, the porcelain boat was placed in a tube furnace, and two furnace plugs were placed at two ends of the tube, respectively;

(3) After connecting the device, checking the air tightness, and then carrying out air extraction and air supplementation 6 times, air in the tube was exhausted, no air was extracted after the last air supplementation. Argon gas was introduced at a flow rate of 20 SCCM, heated to 700° C. at a heating rate of 10° C./min, and continuously heated at 700° C. for 120 minutes;

(4) After cooling to room temperature, the obtained sample was ground in a mortar for 20 minutes to obtain $V_2O_3$/VN/$Mo_2C$ nano powder.

Figure 3:
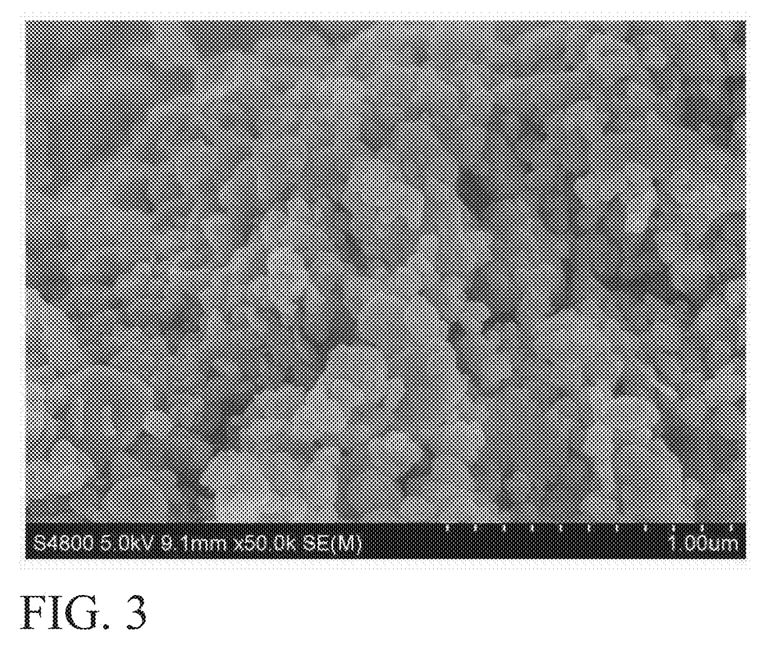
FIG. 3 shows a scanning electron microscope (SEM) image of the $V_2O_3/VN/Mo_2C$ nanoelectrode material prepared in Example 4.

FIG. 3 shows a scanning electron microscope (SEM) image of the $V_2O_3$/VN/$Mo_2C$ nanoelectrode material prepared in Example 4. It can be seen that the morphology of the sample is uniformly dispersed and more active sites are exposed.

EXAMPLE 5

(1) Urea ($CH_4N_2O$), vanadium acetylacetonate ($C_{15}H_{21}O_6V$), and sodium molybdate dihydrate ($Na_2MoO_4.2H_2O$) were weighed according to the mass ratio of 39:5:3;

(2) The above raw materials were mixed, ground for 25 minutes, put in a porcelain boat, the porcelain boat was placed in a tube furnace, and two furnace plugs were placed at two ends of the tube, respectively;

(3) After connecting the device, checking the air tightness, and then carrying out air extraction and air supplementation 5 times, air in the tube was exhausted, no air was extracted after the last air supplementation. Argon gas was introduced at a flow rate of 40 SCCM, heated to 800° C. at a heating rate of 5° C./min, and continuously heated at 800° C. for 180 minutes;

(4) After cooling to room temperature, the obtained sample was ground in a mortar for 25 minutes to obtain $V_2O_3$/VN/$Mo_2C$ nano powder.

Figure 5:
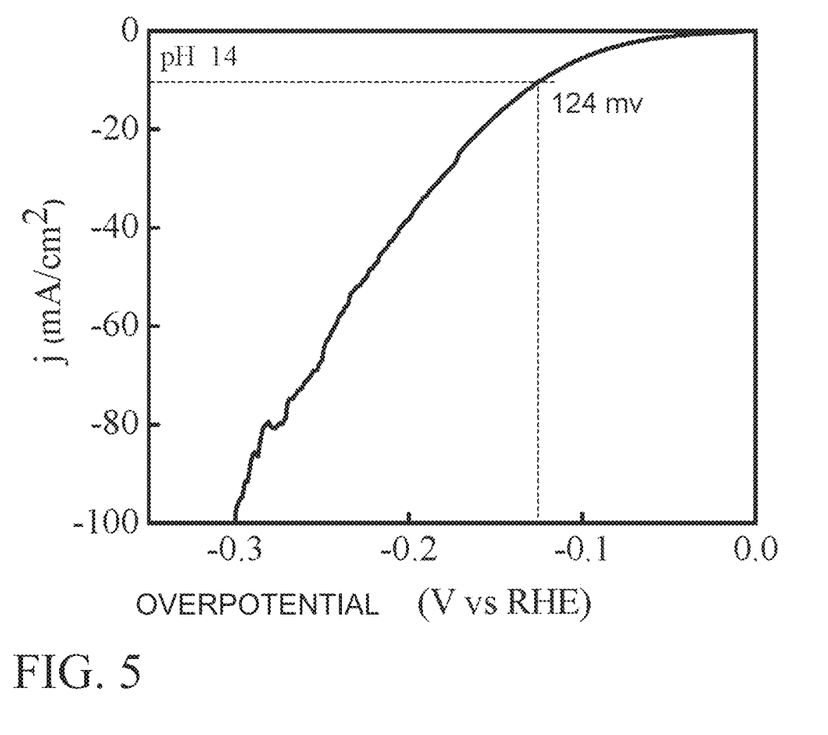
FIG. 5 shows a hydrogen production performance diagram of the $V_2O_3/VN/Mo_2C$ nanoelectrode material prepared in Example 5 under the condition of pH 14.
Figure 10:
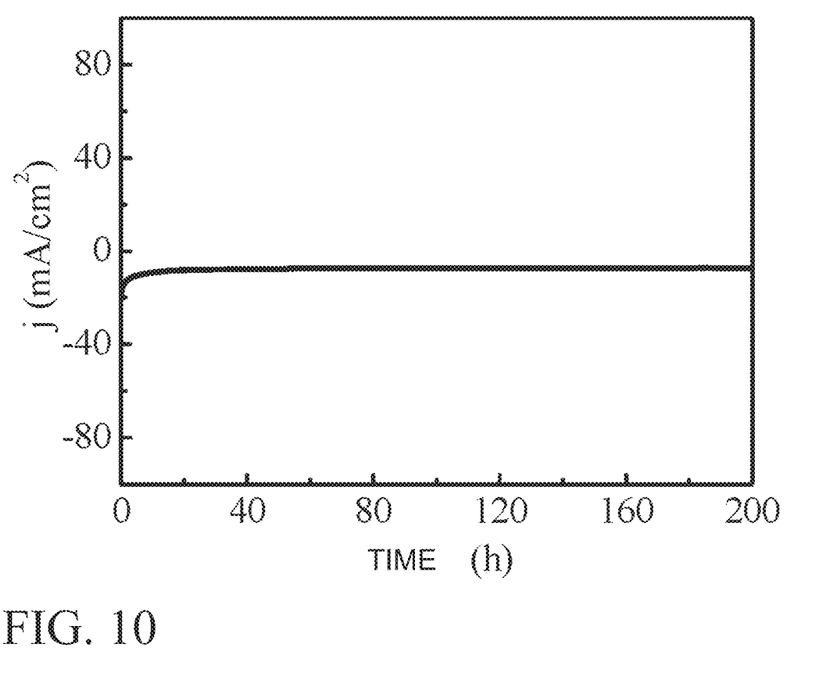
FIG. 10 shows a time-current curve diagram of $V_2O_3/VN/Mo_2C$ prepared in Example 5.

FIG. 5 shows a hydrogen production performance diagram of the $V_2O_3$/VN/$Mo_2C$ nanoelectrode material prepared in Example 5, showing that the sample has an overpotential of 124 mV under alkaline test conditions when the current density is 10 mA/$cm^2$ and the scanning rate is 3 mV/s, indicating that the material has excellent catalytic performance. FIG. 10 shows the time-current curve diagram of $V_2O_3$/VN/$Mo_2C$ prepared in Example 5. It can be seen that the sample can stably operate at 10 mA/$cm^2$ for 200 hours in alkaline conditions, indicating that the sample has excellent stability.

EXAMPLE 6

(1) Urea ($CH_4N_2O$), vanadium acetylacetonate ($C_{15}H_{21}O_6V$), and sodium molybdate dihydrate ($Na_2MoO_4.2H_2O$) were weighed according to the mass ratio of 40:4:2;

(2) The above raw materials were mixed, ground for 20 minutes, put in a porcelain boat, the porcelain boat was placed in a tube furnace, and two furnace plugs were placed at two ends of the tube, respectively;

(3) After connecting the device, checking the air tightness, and then carrying out air extraction and air supplementation 6 times, air in the tube was exhausted, no air was extracted after the last air supplementation. Argon gas was introduced at a flow rate of 30 SCCM, heated to 700° C. at a heating rate of 10° C./min, and continuously heated at 700° C. for 120 minutes;

(4) After cooling to room temperature, the obtained sample was ground in a mortar for 20 minutes to obtain $V_2O_3$/VN/$Mo_2C$ nano powder.

Figure 6:
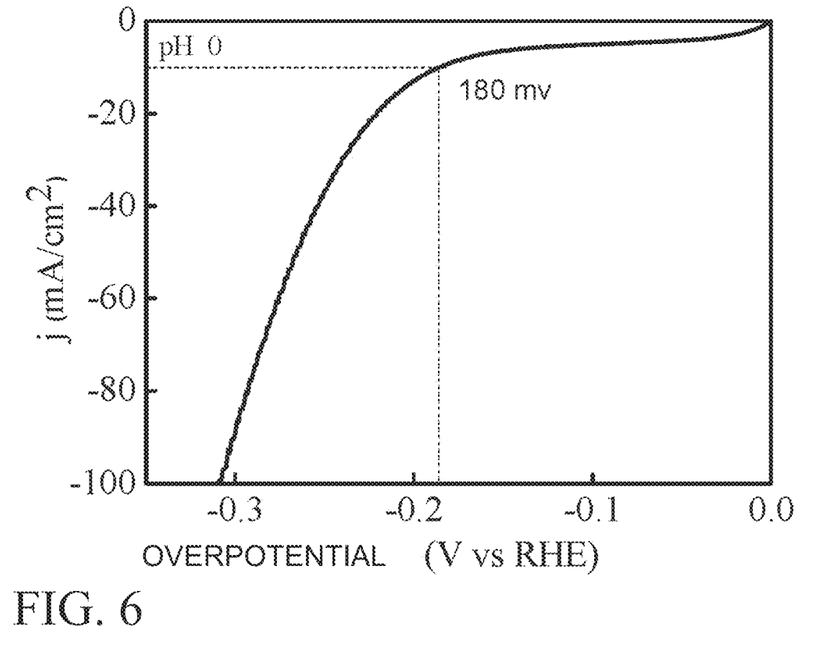
FIG. 6 shows a hydrogen production performance diagram of the $V_2O_3/VN/Mo_2C$ nanoelectrode material prepared in Example 6 under the condition of pH 0.

FIG. 6 shows a hydrogen production performance diagram of the $V_2O_3$/VN/$Mo_2C$ nanoelectrode material prepared in Example 6, showing that the sample has an overpotential of 180 mV under acidic test conditions when the current density is 10 mA/$cm^2$ and the scan rate is 3 mV/s, indicating good catalytic activity.

Figure 7:
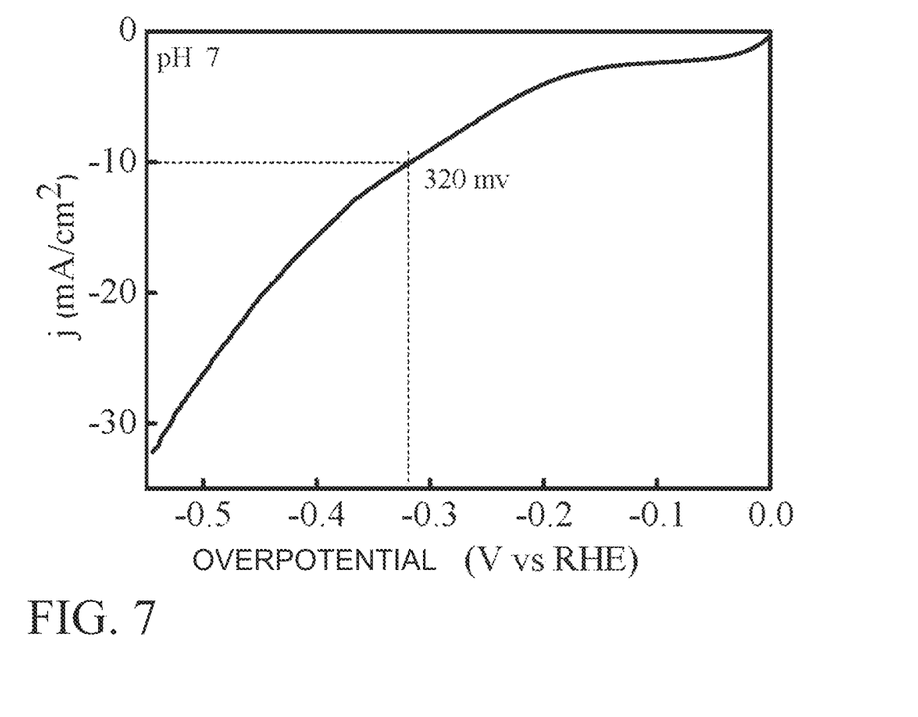
FIG. 7 shows a hydrogen production performance diagram of the $V_2O_3/VN/Mo_2C$ nanoelectrode material prepared in Example 6 under the condition of pH 7.

FIG. 7 shows a hydrogen production performance diagram of the $V_2O_3$/VN/$Mo_2C$ nanoelectrode material prepared in Example 6, showing that the overpotential of this sample is 320 mV under neutral test conditions when the current density is 10 mA/$cm^2$ and the scan rate is 3 mV/s, indicating satisfactory catalytic performance.

COMPARATIVE EXAMPLE 1

Comparative Example 1 is basically the same as Example 1, except that the mass ratio of the carbon-nitrogen homologous compound, the vanadium source, and the molybdenum source was 42:5:3.

Figure 4:
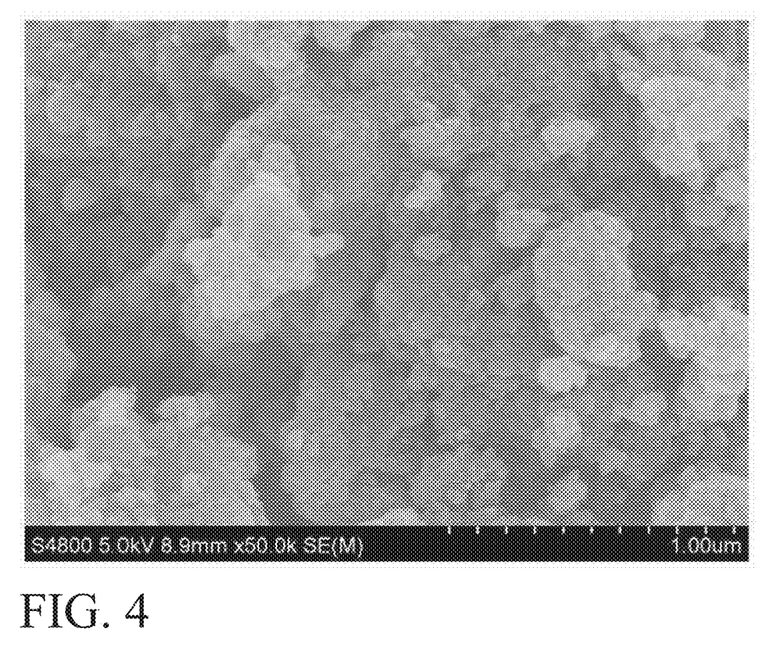
FIG. 4 shows an SEM image of the product prepared in Comparative Example 1.
Figure 8:
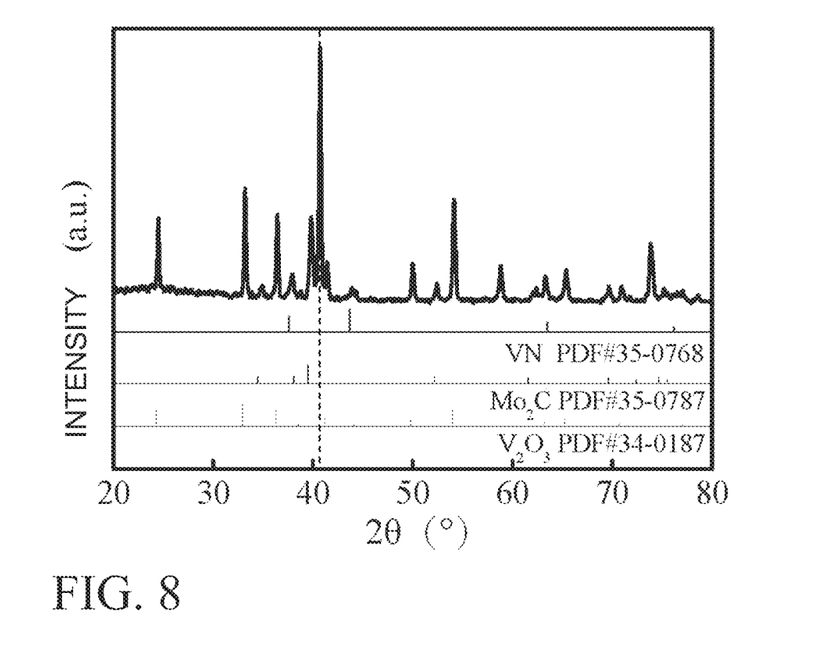
FIG. 8 shows an XRD pattern of the product prepared in Comparative Example 1.
Figure 9:
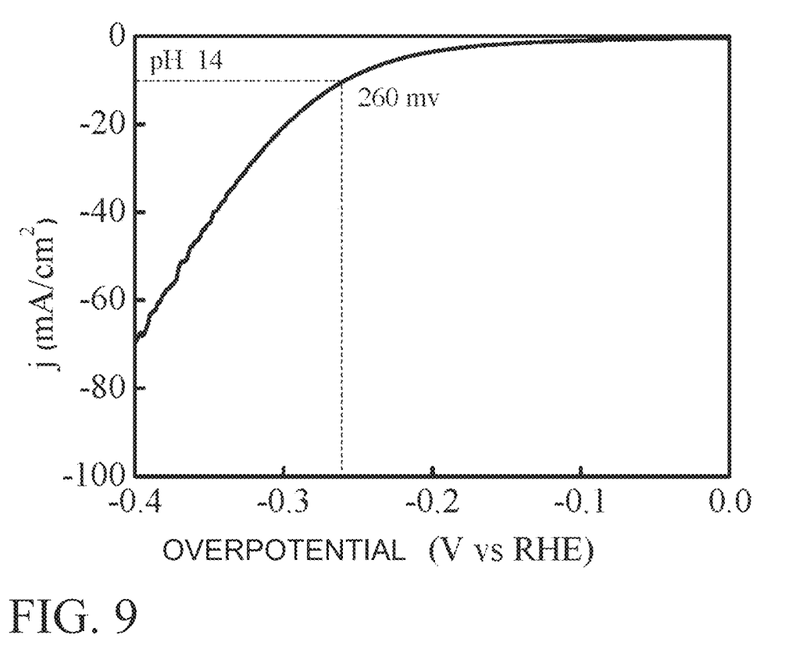
FIG. 9 shows a hydrogen production performance diagram of the product prepared in Comparative Example 1 under the condition of pH 14.

FIG. 4 shows the SEM image of the product prepared in Comparative Example 1. It can be seen that the nanoparticles are seriously agglomerated and are not uniformly dispersed. This is because when the amount of the carbon-nitrogen homologous compound used is increased, more reducing gas $NH_3$ is generated by pyrolysis, more $V_2C$ is generated by reduction, and the aggregation becomes serious (because $V_2C$ has a higher surface energy than VN, more crystal nuclei are formed, and agglomeration easily occurs). FIG. 8 shows the XRD pattern of the product prepared in Comparative Example 1, in which a large amount of impure phase $V_2C$ was formed with increasing addition amount of carbon-nitrogen homologous compound, and the crystallinity of VN was deteriorated. FIG. 9 shows the LSV diagram of the product prepared in Comparative Example 1, showing that the sample has an overpotential of 260 mV, and the product performance deteriorates under the alkaline test conditions when the current density is 10 mA/$cm^2$ and the scan rate is 3 mV/s. The reason is that the amount of carbon-nitrogen homologous compound is increased, the appearance of the product is agglomerated, and the miscellaneous phase $V_2C$ is introduced, so that the number of active sites is less exposed, and the hydrogen production performance is poor.

The invention claimed is:

1. A three-phase system $V_2O_3$/VN/$Mo_2C$ nanoelectrode material, the nanoelectrode material comprising:

$V_2O_3$ particles, VN particles, and $Mo_2C$ particles, wherein the $V_2O_3$ particles, VN particles, and $Mo_2C$ particles are interlaced in lattice stripes and are uniformly distributed, and a mass ratio of the $V_2O_3$, VN, and $Mo_2C$ is (1 to 4):(10 to 40):(4 to 16).

2. The nanoelectrode material according to claim 1, wherein particle diameters of the $V_2O_3$ particles, VN particles, and $Mo_2C$ particles are respectively 10 to 50 nm, 10 to 100 nm, and 5 to 100 nm.

3. The nanoelectrode material according to claim 1, wherein the nanoelectrode material has a heterojunction structure.

4. A preparation method of a three-phase system $V_2O_3$/VN/$Mo_2C$ nanoelectrode material, the nanoelectrode material comprising:

$V_2O_3$ particles, VN particles, and $Mo_2C$ particles, wherein the $V_2O_3$ particles, VN particles, and $Mo_2C$ particles are interlaced in lattice stripes and are uniformly distributed, and a mass ratio of the $V_2O_3$, VN, and $Mo_2C$ is (1 to 4):(10 to 40):(4 to 16), the preparation method comprising the following steps:

weighing and mixing the raw materials including carbon-nitrogen homologous compounds, a vanadium source, and a molybdenum source, wherein the mass ratio of the carbon-nitrogen homologous compound, the vanadium source, and the molybdenum source is (30 to 40):(3 to 5):(1 to 3); and then maintaining heat at 600 to 800° C. for 120 to 180 minutes under the protection of inert gas to obtain the three-phase system $V_2O_3$/VN/$Mo_2C$ nanoelectrode material.

5. The preparation method according to claim 4, wherein the carbon-nitrogen homologous compound is pyrolyzed during the maintaining of heat to generate reducing gas and uniformly disperse the components of the $V_2O_3$/VN/$Mo_2C$ nano electrode material.

6. The preparation method according to claim 4, wherein the carbon-nitrogen homologous compound is at least one of urea, dicyandiamide, and melamine.

7. The preparation method according to any one of claim 4, wherein the molybdenum source comprises sodium molybdate dihydrate and/or ammonium molybdate tetrahydrate.

8. The preparation method according to claim 4, wherein the vanadium source comprises at least one of vanadium acetylacetonate, ammonium metavanadate, and sodium metavanadate.

9. A hydrogen production system comprising the three-phase system $V_2O_3$/VN/$Mo_2C$ nano-electrode material of claim 1, wherein the nano-electrode material is configured to produce hydrogen by water electrolysis.

* * * * *